(12) United States Patent
Liu et al.

(10) Patent No.: US 11,201,991 B1
(45) Date of Patent: Dec. 14, 2021

(54) BINOCULAR ROBOT FOR BRIDGE UNDERWATER DETECTION BASED ON 5G COMMUNICATION

(71) Applicant: Guangzhou University, Guangzhou (CN)

(72) Inventors: Airong Liu, Guangzhou (CN); Zhicheng Yang, Guangzhou (CN); Jiyang Fu, Guangzhou (CN); Yixiao Zhang, Guangzhou (CN); Bingcong Chen, Guangzhou (CN); Xiaoyong Hu, Guangzhou (CN); Xiangrong Yuan, Guangzhou (CN); Dayang Wang, Guangzhou (CN); Lixue Zhu, Guangzhou (CN); Zewen Tao, Weihai (CN)

(73) Assignee: Guangzhou University, Guangzhou (CN)

( * ) Notice: Subject to any disclaimer, the term of this patent is extended or adjusted under 35 U.S.C. 154(b) by 0 days.

(21) Appl. No.: 17/459,002

(22) Filed: Aug. 27, 2021

(30) Foreign Application Priority Data

Jan. 27, 2021 (CN) .......................... 202110114194.8

(51) Int. Cl.
*B63H 21/17* (2006.01)
*H04N 5/225* (2006.01)
(Continued)

(52) U.S. Cl.
CPC ........... *H04N 5/2252* (2013.01); *B63B 45/00* (2013.01); *B63B 79/10* (2020.01); *B63C 7/06* (2013.01);
(Continued)

(58) Field of Classification Search
CPC ..... B63B 45/00; B63B 79/10; B63B 2201/00; B63C 7/06; B63H 21/17
See application file for complete search history.

(56) References Cited

U.S. PATENT DOCUMENTS 4,502,407 A * 3/1985 Stevens ............... E02B 17/0034
114/222
6,965,411 B1 * 11/2005 Jones ................... F16M 11/125
348/373
(Continued)

FOREIGN PATENT DOCUMENTS

CN 109591989 A * 4/2019

*Primary Examiner* — Andrew Polay
(74) *Attorney, Agent, or Firm* — Getech Law LLC; Jun Ye

(57) ABSTRACT

The invention discloses a binocular robot for bridge underwater detection based on 5G communication. The robot includes a body, a base, a power arm, a video collection component, a communication component and a power component. The underwater part of the bridge may be collected in the form of a video by the configured video collection component, and the robot may be driven by the power component to move underwater. Driven by a first motor, a binocular camera may rotate to observe various orientations underwater, and meanwhile may drive a cleaning component coordinated with an electric top block to wipe the lens of the binocular camera, so that the video information may be collected clearly underwater. Finally, the video information may be transmitted to a worker on the water through the communication component to achieve the effect of remote detection, which saves the underwater detection cost and improves detection efficiency.

6 Claims, 2 Drawing Sheets

(51) Int. Cl.
B63C 7/06 (2006.01)
B63B 45/00 (2006.01)
B63B 79/10 (2020.01)
B63G 8/00 (2006.01)

(52) U.S. Cl.
CPC .......... B63H 21/17 (2013.01); *B63B 2201/00* (2013.01); *B63G 8/00* (2013.01)

(56) References Cited

U.S. PATENT DOCUMENTS

| | | | |
|---|---|---|---|
| 9,511,831 B2* | 12/2016 | Kimura | B63G 8/001 |
| 10,272,980 B2* | 4/2019 | Abdellatif | G01N 29/225 |
| 10,619,321 B2* | 4/2020 | Hess | B05B 13/0436 |
| 2017/0081000 A1* | 3/2017 | Cioanta | B06B 1/02 |

* cited by examiner

The signal transmitting module is arranged in the body with one side provided with a groove, the reel is rotationally connected to the reel, one end of the communication line is connected with the signal transmitting module and the other end of the communication line is connected with the communication antenna fixed on the buoy, and the communication line is wound on the reel.

BINOCULAR ROBOT FOR BRIDGE UNDERWATER DETECTION BASED ON 5G COMMUNICATION

TECHNICAL FIELD

The disclosure relates to a field of an underground robot, and more particularly to a binocular robot for bridge underwater detection based on 5G communication.

BACKGROUND

With the development of social economy, city development is getting better and a large number of cross-river and cross-sea bridges are built. Bridges require periodic maintenance and repair during routine use to ensure that vehicles may pass safely. The bridge deck is easily monitored, however, the bridge pier is difficult to be closely observed and detected since it is deep in water. It requires high cost to send the diver to dive underwater for detecting the bridge condition, with low detection efficiency.

SUMMARY

In order to overcome the defects of high detection cost and low efficiency of bridge underwater detection in the related art, the technical problem to be solved by the disclosure is to provide a binocular robot for bridge underwater detection based on 5G communication, which may replace manual underwater detection, with lower use cost compared with manual detection.

For this purpose, the following technical scheme may be adopted:

The disclosure provides a binocular robot for bridge underwater detection based on 5G communication including a body, a base, a power arm, a video collection component, a communication component and a power component. The base is fixed to the bottom of the body, more than two power arms are uniformly fixed to the side wall of the body, and the end of each power arm is fixed with the power component. The video collection component includes an engine base, a binocular camera, an electric top block, a first motor, a transmission shaft and a cleaning component. The engine base in a cylindrical structure is rotationally connected to the body top, the binocular camera is embedded in the engine base, and the cleaning component includes a transmission arm, a curved plate and a wiper, the curved plate being fixed to the lower side of one end of the transmission arm, the wiper being fixed to the inner side of the curved plate, the transmission arm being above the engine base, the wiper being attached to the binocular camera, the first motor being inside the body, one end of the transmission shaft being connected with a power output shaft of the first motor, the other end of the transmission shaft passing through the body, and the engine base being fixedly connected with the other end of the transmission arm. The electric top block is fixed to the inner top wall of the engine base and plugged in a fixing hole open in the transmission shaft. The communication component includes a processor and a signal transmitter both electrically connected to the processor.

In the technical scheme of the disclosure, the power component includes a second motor and a blade, the second motor being fixed at the end of the power arm, and the blade being fixed at the power output end of the second motor.

In the technical scheme of the disclosure, the signal transmitter includes a signal transmitting module, a reel, a communication line, a buoy and a communication antenna.

In the technical scheme of the disclosure, the binocular robot for bridge underwater detection based on 5G communication further includes a mounting rack. The mounting rack is composed of a mounting plate and more than two mounting columns fixed at the bottom of the mounting plate, the top of the body is provided with more than two mounting holes arranged around the engine base and the mounting columns are plugged in the mounting holes.

In the technical scheme of the disclosure, the top of the mounting rack is fixed with an emergency floating component and an illuminating lamp.

In the technical scheme of the disclosure, the emergency floating component includes a gas box, a rubber ball, a gas tank and a valve. The gas tank is arranged in the gas box provided with a through hole, the valve is arranged on the outlet of the gas tank, and the rubber ball connected with an inflation tube passes through the through hole to connect the outlet of the gas tank.

The disclosure has the following beneficial effects:

For the binocular robot for bridge underwater detection based on 5G communication provided in the disclosure, the underwater part of the bridge may be collected in the form of a video by the configured video collection component, and the robot may be driven by the power component to move underwater. Driven by a first motor, the binocular camera may rotate to observe various orientations underwater, and meanwhile may drive a cleaning component coordinated with the electric top block to wipe the lens of the binocular camera, so that the video information may be collected clearly underwater. Finally, the video information may be transmitted to a worker on the water through the communication component to achieve the effect of remote detection, which saves the detection cost and improves detection efficiency.

In the diagram:

11—body, 12—base, 13—power arm, 14—groove, 21—engine base, 22—binocular camera, 23—electric top block, 24—first motor, 25—transmission shaft, 26—transmission arm, 27—curved plate, 28—wiper, 29—fixing hole, 31—second motor, 32—blade, 41—signal transmission module, 42—reel, 43—communication line, 44—buoy, 45—communication antenna, 51—mounting plate, 52—mount column, 6—illuminating lamp, 71—gas box, 72—gas tank, 73—valve, 74—rubber ball, 75—inflation tube.

DETAILED DESCRIPTION

The technical scheme of the disclosure is further illustrated in combination with the appended drawings and implementations.

Figure 1:
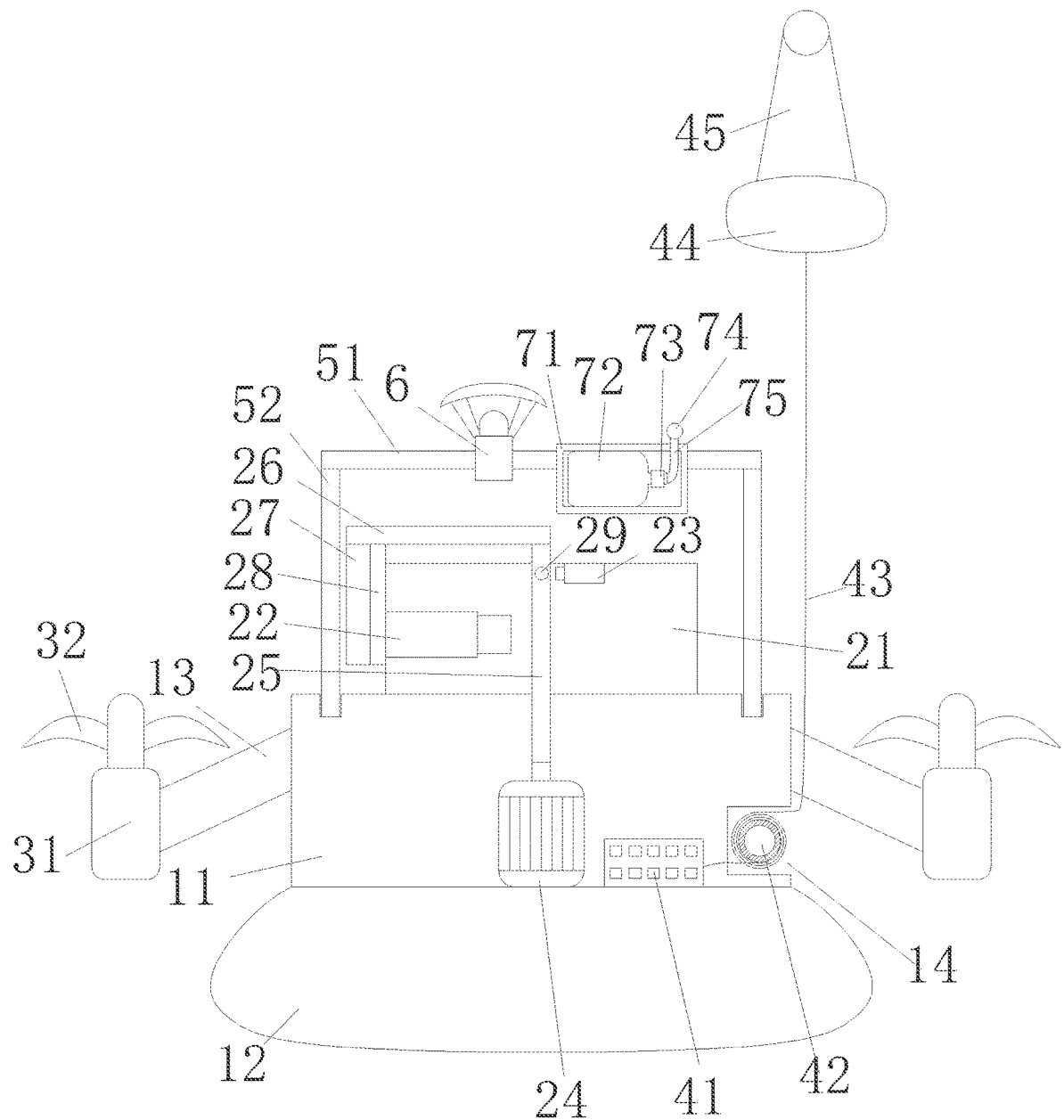
FIG. 1 is a diagram of a structure of a binocular robot for bridge underwater detection based on 5G communication provided by implementations of the disclosure.
Figure 2:
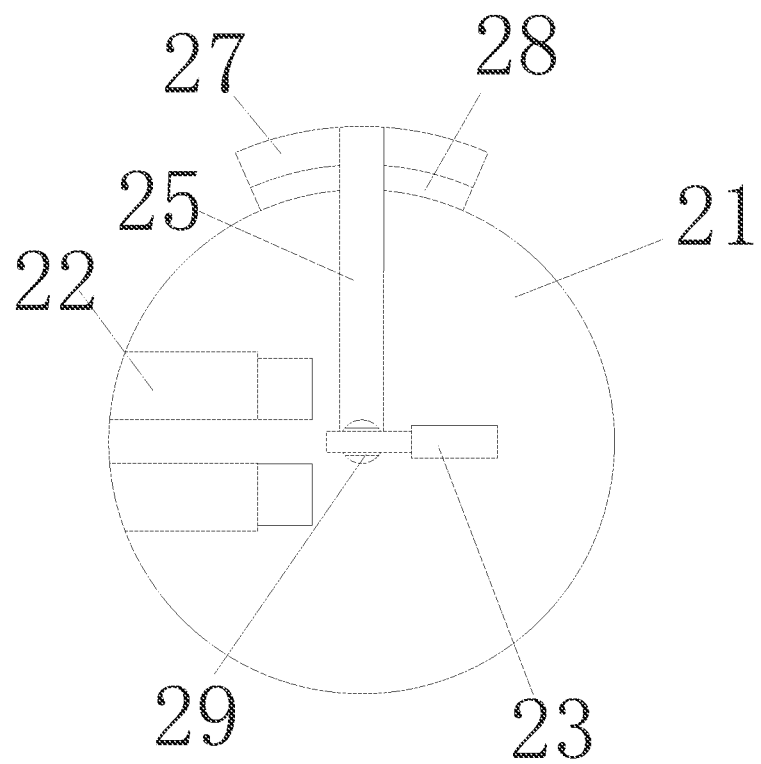
FIG. 2 is a top view of a structure of an engine base in FIG. 1.

As illustrated in FIG. 1-2, a binocular robot for bridge underwater detection based on 5G communication is provided in embodiments. The binocular robot includes a body 11, a base 12, a power arm 13, a video collection component, a communication component and a power component. The base 12 is fixed to the bottom of the body 11, more than two power arms 13 are uniformly fixed to the side wall of the body 11, and the end of each power arm 13 is fixed with a power component. The video collection component includes an engine base 21, a binocular camera 22, an electric top block 23, a first motor 24, a transmission shaft 25 and a cleaning component. The engine base 21 in a cylindrical structure is rotationally connected to the body 11 top, the binocular camera 22 is embedded in the engine base 21, and the cleaning component includes a transmission arm 26, a curved plate 27 and a wiper 28, the curved plate 27 being fixed to the lower side of one end of the transmission arm 26, the wiper 28 being fixed to the inner side of the curved plate 27, the transmission arm 26 being above the engine base 21, the wiper 28 being attached to the binocular camera 22, the first motor being inside the body 11, one end of the transmission shaft 25 being connected with a power output shaft of the first motor 24, the other end of the transmission shaft 25 passing through the body 11, and the engine base 21 being fixedly connected with the other end of the transmission arm 26. The electric top block 23 is fixed to the inner top wall of the engine base 21, and plugged in a fixing hole 29 open in the transmission shaft 25. The communication component includes a processor and a signal transmitter both electrically connected to a processor.

A detection robot is put into water and driven by the power part to the bridge pier part. After arriving at the detection part, start to adjust the angle of the binocular camera 22 to align it to the pier. In the case of adjusting the angle of the binocular camera 22, the electric top block 23 is in an extended state, the free end of the electric top block 23 is inserted into the fixing hole 29 of the transmission shaft 25, the engine base 21 is rotated with the transmission shaft 25, and the first motor 24 is configured as a servo motor to drive the engine base 21 to rotate forward or inverse, that is, drive the binocular camera 22 to rotate. When the binocular camera 22 is aligned to the bridge pier, the first motor 24 stops rotating while the free end of the electric push block 23 is also drawn from the fixing hole 29, at this time, the engine base 21 is not coaxially rotated with the transmission shaft 25. The video information of the bridge is collected by the drive of the power component. During underwater collection, debris in the water may adhere to a binocular camera, which affects the shooting field of view of the video. At this time, the first motor 24 is started to rotate with the transmission arm 26. The curved plate 27 at the end of the transmission arm 26 and the wiper 28 on the curved plate 27 also rotate, and the wiper 28 wipes the lens of the binocular camera 22 to clear the debris adhered thereon to avoid the shooting field of view affected. Losing the connection with the electric top block 23, under the damping effect between the engine base 21 and the body 11, rotating a shaft is not enough to drive the engine base 21 to rotate, therefore, the base 21 may stay in place without rotation so that the wiper 28 may normally wipe the binocular camera 22. The video information collected by the binocular camera 22 is processed by the processor and transmitted via the signal transmitter to the terminal of the worker on water. The processor in the embodiment is a universal video processor, and the specific model is not limited in detail, while the signal transmitter may adopt a 5G signal transmitter or other wireless communication chips.

In this way, diving maintenance by a diver is avoided, and detection efficiency is improved since the position of the robot may be adjusted flexibly and conveniently due to its small size and flexibility.

Specifically, the power component includes a second motor 31 and a blade 32. The second motor 31 is fixed at the end of the power arm 13, and the blade 32 is fixed at the power output end of the second motor 31. The second motor 31 drives the blade 32 to rotate further to achieve the movement of the binocular robot, and different powers are output by the second motor 31 on different power arms 13 to achieve steering and directional movement of the robot.

Specifically, the signal transmitter includes a signal transmitting module 41, a reel 42, a communication line 43, a buoy 44, and a communication antenna 45. The signal transmitting module 41 is arranged in the body 11 with one side provided with a groove 14, the reel 42 is rotationally connected to the reel 42, one end of the communication line 43 is connected with the signal transmitting module 41 and the other end of communication line 43 is connected with the communication antenna 45 fixed on the buoy 44, and the communication line 43 is wound on the reel 42. When the underwater signal is poor, the buoy 44 floats to the water surface, the communication antenna 45 on the buoy 44 is connected to the signal transmitting module 41 underwater through the communication line 43, and the communication antenna 45 transmits the signal to the worker on the water surface, to improve the reliability of signal transmission.

Specifically, the binocular robot for bridge underwater detection based on 5G communication further includes a mounting rack. The mounting rack is composed of a mounting plate 51 and more than two mounting columns 52 fixed at the bottom of the mounting plate 51, the top of the body 11 is provided with more than two mounting holes arranged around the engine base 21, and the mounting columns 52 are plugged in the mounting holes. Other detection devices may be erected on the mounting rack to provide expansion capability for underwater detection and enhance detection capability.

Specifically, a glass baffle is fixed between adjacent mounting columns 52. The glass baffle may provide protection for the engine base 21 to avoid being affected by fishes under water.

Specifically, the top of the mounting rack is fixed with an emergency floating component and an illuminating lamp. In the case of a poor underwater illumination condition, the illuminating lamp 6 may be started for supplementing light, to improve the video recording effect of the binocular camera 22.

Specifically, the emergency floating component includes a gas box 71, a rubber ball 74, a gas tank 72 and a valve 73. The gas tank 72 is arranged in the gas box 71 provided with a through hole, the valve 73 is arranged on the outlet of the gas tank 72, and the rubber ball 74 connected with an inflation tube 75 passes through the through hole to connect the outlet of the gas tank 72. Compressed gas is stored in the tank 72. When the power component fails or is lack of electric quantity, the valve 73 is open. Then, the compressed gas in the tank 72 is filled in the rubber ball 74 through the inflation tube 75. The rubber ball 74 is slowly blown up with larger and larger buoyancy. Finally, the robot is floated to the water surface.

Other techniques of the embodiments adopt the related art.

It may be understood by those skilled in the art that the disclosure is described with reference to preferred embodiments, and various changes or equivalent substitutions may be made for features and embodiments without departing from the spirit and scope of the disclosure. The present disclosure is not limited by the specific embodiments disclosed herein, and other embodiments within the claims of the disclosure are within the protection scope of the present disclosure.

What is claimed:

1. A binocular robot for bridge underwater detection based on 5G communication, comprising: a body (11), a base (12), a power arm (13), a video collection component, a communication component and a power component;
   wherein, the base (12) is fixed to the bottom of the body (11), more than two power arms (13) are uniformly fixed to the side wall of the body (11), and the end of each power arm (13) is fixed with a power component;
   the video collection component comprises an engine base (21), a binocular camera (22), an electric top block (23), a first motor (24), a transmission shaft (25), and a cleaning component;
   the engine base (21) in a cylindrical structure is rotationally connected to the body (11) top, the binocular camera (22) is embedded in the engine base (21), and the cleaning component comprises a transmission arm (26), a curved plate (27) and a wiper (28), the curved plate (27) being fixed to the lower side of one end of the transmission arm (26), the wiper (28) being fixed to the inner side of the curved plate (27), the transmission arm (26) being above the engine base (21), the wiper (28) being attached to the binocular camera (22), the first motor being inside the body (11), one end of the transmission shaft (25) being connected with a power output shaft of the first motor (24), the other end of the transmission shaft (25) passing through the body (11) and the engine base (21) being fixedly connected with the other end of the transmission arm (26);
   the electric top block (23) is fixed to the inner top wall of the engine base (21), and plugged in a fixing hole (29) open in the transmission shaft (25);
   the communication component comprises a processor and a signal transmitter both electrically connected to a processor.

2. The binocular robot according to claim 1, wherein, the power component comprising a second motor (31) and a blade (32), the second motor (31) being fixed at the end of the power arm (13), and the blade (32) being fixed at the power output end of the second motor (31).

3. The binocular robot according to claim 1, wherein, the signal transmitter comprising a signal transmitting module (41), a reel (42), a communication line (43), a buoy (44) and a communication antenna (45); the signal transmitting module (41) being arranged in the body (11) with one side provided with a groove (14), the reel (42) being rotationally connected to the reel (42), one end of the communication line (43) being connected with the signal transmitting module (41) and the other end of the communication line (43) being connected with the communication antenna (45) fixed on the buoy (44), and the communication line (43) being wound on the reel (42).

4. The binocular robot according to claim 1, wherein, further comprising a mounting rack, wherein, the mounting rack is composed of a mounting plate (51) and more than two mounting columns (52) fixed at the bottom of the mounting plate (51), the the body (11) top is provided with more than two mounting holes arranged around the engine base (21); and the mounting columns (52) are plugged in the mounting holes.

5. The binocular robot according to claim 4, wherein, the top of the mounting rack being fixed with an emergency floating component and an illuminating lamp.

6. The binocular robot according to claim 1, wherein, the emergency floating component comprising a gas box (71), a rubber ball (74), a gas tank (72) and a valve (73), wherein, the gas tank (72) is arranged in the gas box (71) provided with a through hole, the valve (73) is arranged on the outlet of the gas tank (72), and the rubber ball (74) connected with an inflation tube (75) passes through the through hole to connect the outlet of the gas tank (72).

* * * * *